US012785476B2

(12) United States Patent
Silva et al.

(10) Patent No.: US 12,785,476 B2

(45) Date of Patent: Nov. 3, 2026

(54) ROTOR YOKE FOR A ROTOR OF A ROTATING ELECTRIC MACHINE

(71) Applicant: WEG EQUIPAMENTOS ELÉTRICOS S/A, Jaraguá do Sul (BR)

(72) Inventors: Daniel Flores Silva, Jaraguá do Sul (BR); Mateus Moro Lumertz, Jaraguá do Sul (BR)

(73) Assignee: WEG EQUIPAMENTOS ELÉTRICOS S/A, Jaraguá do Sul (BR)

( * ) Notice: Subject to any disclaimer, the term of this patent is extended or adjusted under 35 U.S.C. 154(b) by 207 days.

(21) Appl. No.: 18/654,615

(22) Filed: May 3, 2024

(65) Prior Publication Data

US 2025/0260280 A1 Aug. 14, 2025

(30) Foreign Application Priority Data

Feb. 14, 2024 (BR) ...................... 10 2024 002858 9

(51) Int. Cl.

*H02K 1/27* (2022.01)

*H02K 1/2793* (2022.01)

(52) U.S. Cl.

CPC .................................. *H02K 1/2793* (2013.01)

(58) Field of Classification Search

CPC .... H02K 1/2793; H02K 1/2795; H02K 21/24; H02K 1/16

See application file for complete search history.

(56) References Cited

U.S. PATENT DOCUMENTS 12,301,060 B2 * 5/2025 Yao ...................... H02K 1/2793
2024/0039350 A1 * 2/2024 Geng ...................... H02K 21/24

FOREIGN PATENT DOCUMENTS

CN 110212727 A * 9/2019 ............. H02K 21/24
CN 116054519 A * 5/2023 ............. H02K 21/24
DE 102022004616 A1 * 6/2024 ............... H02K 3/28

OTHER PUBLICATIONS

CN-116054519-A machine translation Jan. 8, 2026.*
CN-110212727-A machine translation Jan. 8, 2026.*
DE-102022004616-A1 machine translation Jan. 8, 2026.*

* cited by examiner

*Primary Examiner* — Leda T Pham

(74) *Attorney, Agent, or Firm* — Tarolli, Sundheim, Covell & Tummino LLP

(57) ABSTRACT

The present invention refers to a rotor yoke (1) for a rotor of a rotating electric machine comprising a yoke base (3) and at least one grooved plate (4) fastened to the yoke base (3). The grooved plate (4) comprises a plurality of through-grooves (10) formed by grooved sections (11) distributed radially and wherein, between two adjacent grooved sections (11), a non-grooved plate section (13) is formed.

9 Claims, 5 Drawing Sheets

ROTOR YOKE FOR A ROTOR OF A ROTATING ELECTRIC MACHINE

RELATED APPLICATIONS

This application is a U.S. Nonprovisional Application, claiming priority to Serial No. BR 10 2024 002858 9, filed on 14 Feb. 2024, the entirety of which is hereby incorporated herein by reference.

FIELD OF THE INVENTION

The present invention refers to rotating electric machines and, more specifically, to a rotating electric machine with improved energy efficiency.

BACKGROUND OF THE INVENTION

Electric machines are equipment used to transform electric into mechanical energy, in the case of motors, and vice-versa, in the case of generators. They are generally formed by a rotor, which is the rotary component, a static element called stator, bearings responsible for joining the static and rotary parts, and the shell that constitutes not only the role of casing of the systems referred to above but promotes integration with other auxiliary systems.

The energy efficiency of an electric machine is related to its consumption of energy and its performance. The performance of the machine may be negatively affected by various factors, such as mechanical losses, resulting, for example, from excessive attrition and electrical losses.

Electrical losses generally comprise Joule effect losses, hysteresis losses and eddy current losses.

Eddy current losses are generated in various parts of the motor due to the variation of the magnetic flux. In the case of synchronous motors, the fundamental component of the magnetic flux seen by the rotor is static, not generating eddy current losses. However, effects like the opening of stator grooves and power supply with frequency inverters result in harmonics in the rotor's magnetic flux waveform, resulting in eddy current losses in all the solid and conductive bodies that make up the rotor, such as the steel yoke and the permanent magnets.

Since the eddy current losses depend on the square of the cross-section of the solid body where there is a variation in magnetic flux, the solutions to reduce them normally involve segmenting the body into sets of smaller sections.

Document CN116054519, for example, shows a rotor structure for an axial magnetic flux motor whose solution comprises an iron core comprising a plurality of surface layer bodies and a plurality of interpolar bodies, the surface layer bodies and the interpolar bodies being connected sequentially at intervals to form the core. The plurality of permanent magnets is disposed circumferentially at intervals with the surface layer bodies covering at least partially the upper surfaces of the permanent magnets and the interpolar bodies being installed between two adjacent permanent magnets. The core may comprise slots formed in the surface layer bodies and in the interpolar bodies, designed to reduce the formation of eddy current losses. Said slots are shown in the document as circular slots which extend through the surface body and through the side plate of the interpolar body, but do not completely penetrate through the interpolar side plate so that the core plate does not break.

Document CN110391703 shows a rotor yoke for an axial flux permanent magnet motor that comprises a rotor yoke body having a solid ring plate shape, with an inner ring protrusion and an outer ring protrusion and a ring recess, between the inner and outer protrusions, wherein the permanent magnets are installed. The ring recess is provided with a plurality of ring grooves distributed radially, with the objective of reducing the eddy current losses.

Although the documents cited above show solutions for reducing eddy current losses in the rotor, the need remains in the state of the art for solutions that are even more efficient at reducing eddy current losses and improving the energy efficiency of rotating electric machines.

Objectives of the Invention

It is one of the objectives of the present invention to provide a rotor yoke for a rotating electric machine that is capable of reducing the occurrence of eddy current losses, increasing the energy efficiency of the machine, while presenting improved manufacturing and mechanical sturdiness.

It is another objective of the present invention to provide a rotor yoke for a rotating electric machine that is capable of reducing the occurrence of eddy current losses while maintaining the rigidity of the yoke without adversely affecting the sturdiness of the machine.

It is a further objective of the present invention to provide a rotor yoke for a rotating electric machine that reduces the occurrence of eddy current losses by enabling a correct and safe positioning of the magnets in the rotor of the machine.

BRIEF DESCRIPTION OF THE INVENTION

The present invention achieves the above objectives by means of a rotor yoke for a rotor of a rotating electric machine, comprising:

- a yoke base and at least one grooved plate welded to the yoke base.

The flat base is arranged to receive the at least one grooved plate and the grooved plate comprises a plurality of through-grooves formed by radially-distributed grooved sections, wherein, between two adjacent grooved sections, a non-grooved plate section is formed, such that the grooved plate comprises a plurality of non-grooved plate sections.

In an embodiment of the invention, the rotor yoke comprises a plurality of magnets fastened on the grooved plate, wherein a central radial geometric line of each magnet coincides with a central radial geometric line matching each non-grooved section.

Also, in an embodiment of the invention, each one of the plurality of non-grooved plate sections presents recesses for allocating glue for magnets.

The yoke base may comprise a ring disk with a central hole, an outer edge wall, an inner edge wall, and the flat base is, in this embodiment, a lowered flat base formed between the outer edge wall and the inner edge wall.

In an embodiment of the invention, the outer edge wall comprises a cut-out wall formed by a plurality of wall portions of a first height and a plurality of wall portions of a second height, wherein the second height is higher than the first height. In this embodiment, the portions of the plurality of wall portions of a first height have a greater arc length than an arc length of the portions of the plurality of wall portions of a second height.

In an embodiment of the invention, each one of the plurality of non-grooved plate sections is radially aligned with a portion of the plurality of wall portions of a second height.

Preferably, each one of the grooved sections comprises a continuous zig-zag-shaped through-groove, the continuous zig-zag-shaped through-groove having portions substantially parallel which decrease in length as they approach the central hole. The continuous zig-zag-shaped through-groove may be advantageously formed by laser cutting.

In embodiments of the invention, the rotor yoke comprises two identical grooved plates welded to the yoke base.

BRIEF DESCRIPTION OF DRAWINGS

The present invention will now be described in greater detail, with references to the accompanying drawings, wherein.

DETAILED DESCRIPTION OF THE INVENTION

The present invention will now be described based on preferred embodiments shown in FIGS. 1 to 10.

The present invention comprises a rotor yoke for a rotating electric machine, be it a motor or a generator. The construction and function of this type of rotor is known by persons skilled in the art, such that only the elements and characteristics necessary for a complete understanding of the rotor yoke of the present invention by a person skilled in the art will be detailed in this description.

Figure 1:
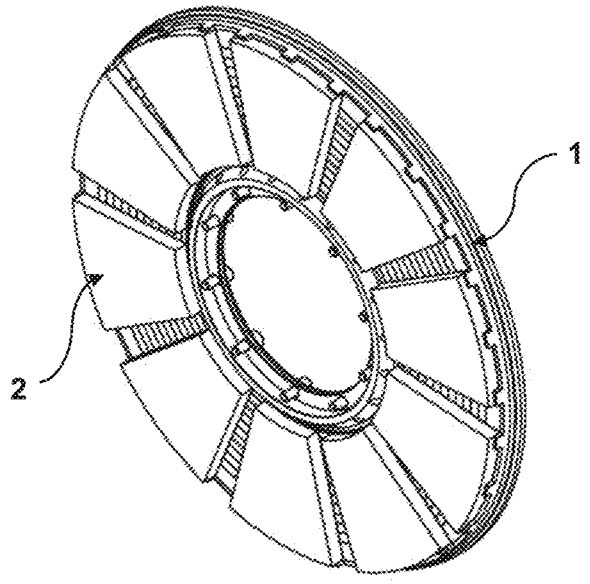
FIG. 1—is a perspective view of a rotor yoke according to an embodiment of the present invention, the yoke being illustrated with magnets fastened.

FIG. 1 shows a rotor yoke 1 according to the present invention, and, more specifically a rotor yoke for an axial flux motor, which is arranged to receive a plurality of magnets 2.

Figure 2:
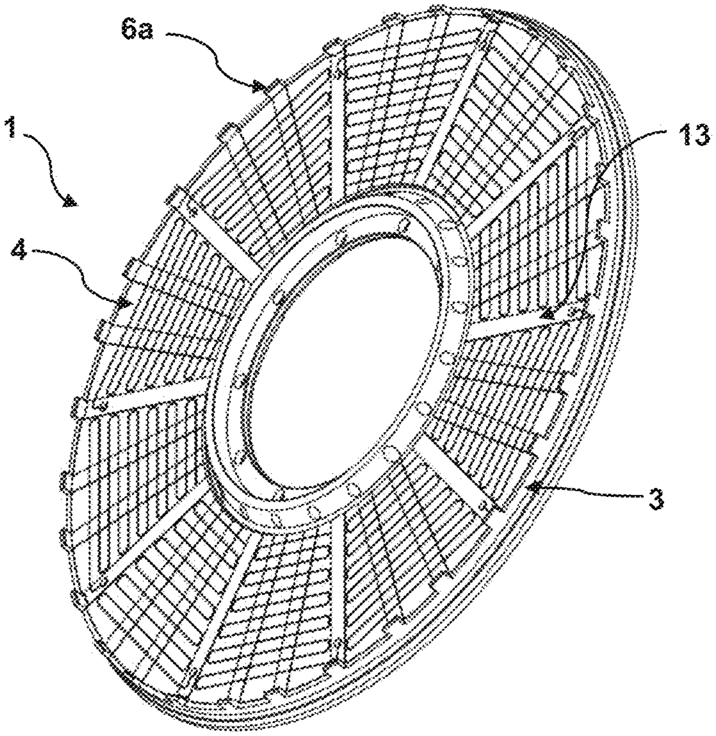
FIG. 2—is a perspective view of a rotor yoke according to an embodiment of the present invention.

FIG. 2 shows the rotor yoke 1 without the plurality of magnets 2.

The rotor yoke 1 comprises a yoke base 3 and at least one grooved plate 4 fastened to the yoke base 3. In the embodiment illustrated of the invention, the grooved plate 4 is fastened to the base of the yoke 3 by welding, but in other embodiments the mode of fastening can be different, utilizing, for example, screws, rivets or glue.

It has to be emphasized that the term "grooved plate" as utilized herein may comprise both the one-piece plate and a plurality of separate plate segments fastened to the yoke base 3 to form the plate.

Figure 3:
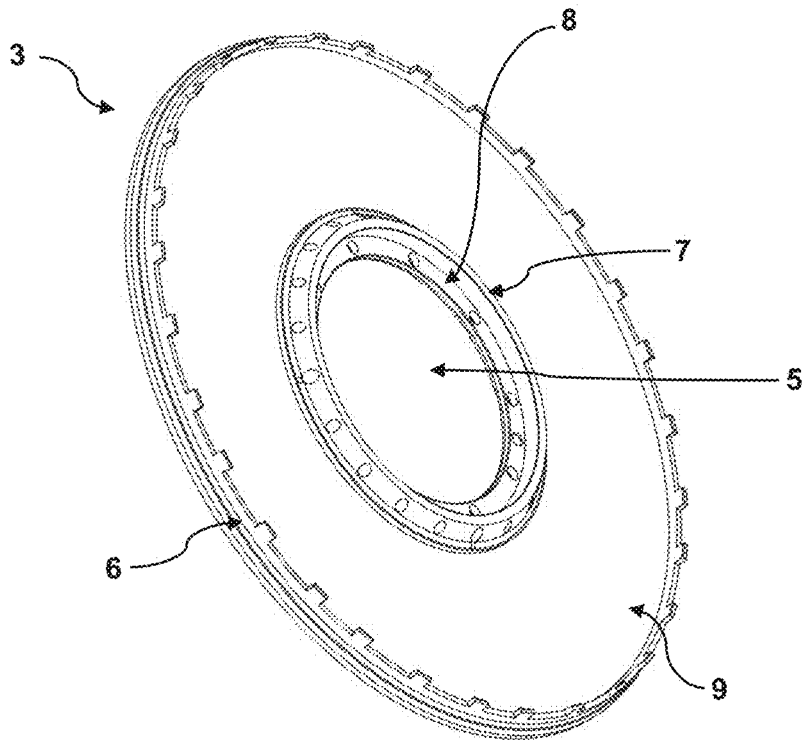
FIG. 3—is a perspective top view of the base of a rotor yoke according to an embodiment of the present invention.
Figure 4:
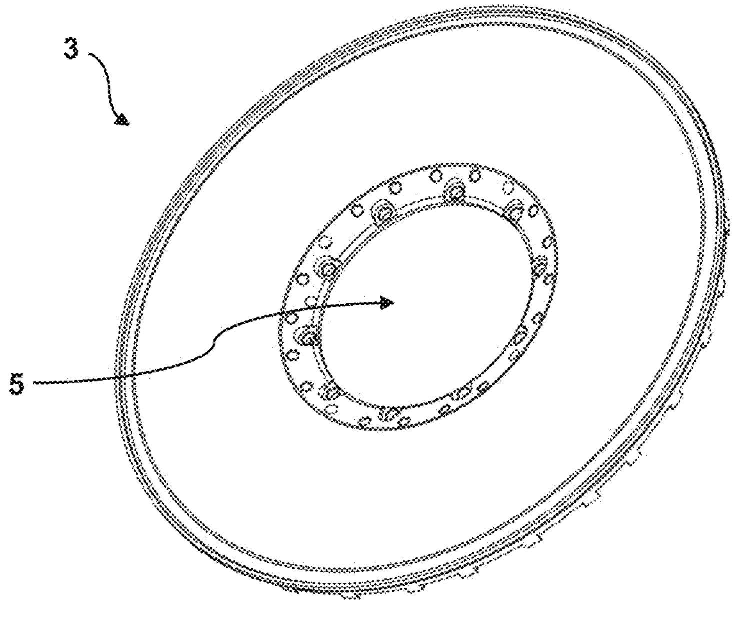
FIG. 4—is a perspective bottom view of the base of a rotor yoke according to an embodiment of the present invention.

As better illustrated in FIGS. 3 and 4, in the embodiment illustrated in the drawings, the yoke base 3 has a ring disk with a central hole 5, an outer edge wall 6, an inner edge wall 7 and an inner flap 8 that surrounds the central hole 5.

Between the outer edge wall 6 and the inner edge wall 7, the disk has a flat ring base 9 arranged to receive the at least one grooved plate 4. In the embodiment illustrated in the figures, the flat ring base 9 is a lowered ring base, but other shapes could equally be utilized in alternative embodiments.

Figure 5:
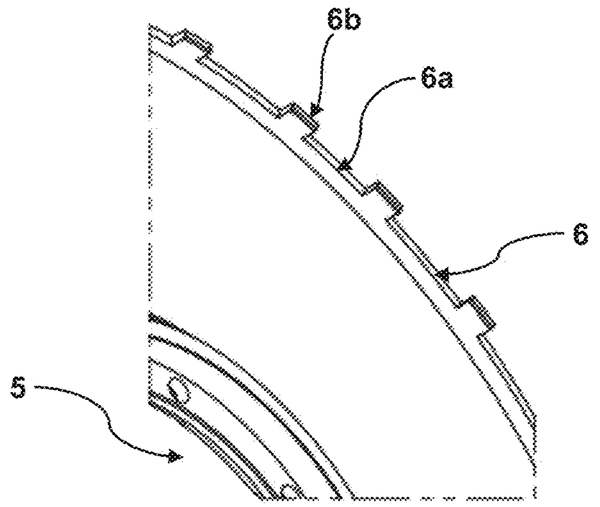
FIG. 5—is an exploded version of part of the outer edge wall of the base of a rotor yoke according to an embodiment of the present invention.

The outer edge wall 6, which acts as structural support ring, preferably comprises a cut-out wall, as better illustrated in the exploded view of the FIG. 5.

In this embodiment, a cut-out wall thus comprises a plurality of wall portions of a first height 6*a* and a plurality of wall portions of a second height 6*b*, the second height being higher than the first height, so as to form teeth 6*b*. It is notable that in alternative arrangements of the present invention, the two portions could be the same height, not defining teeth 6*b*.

Figure 6:
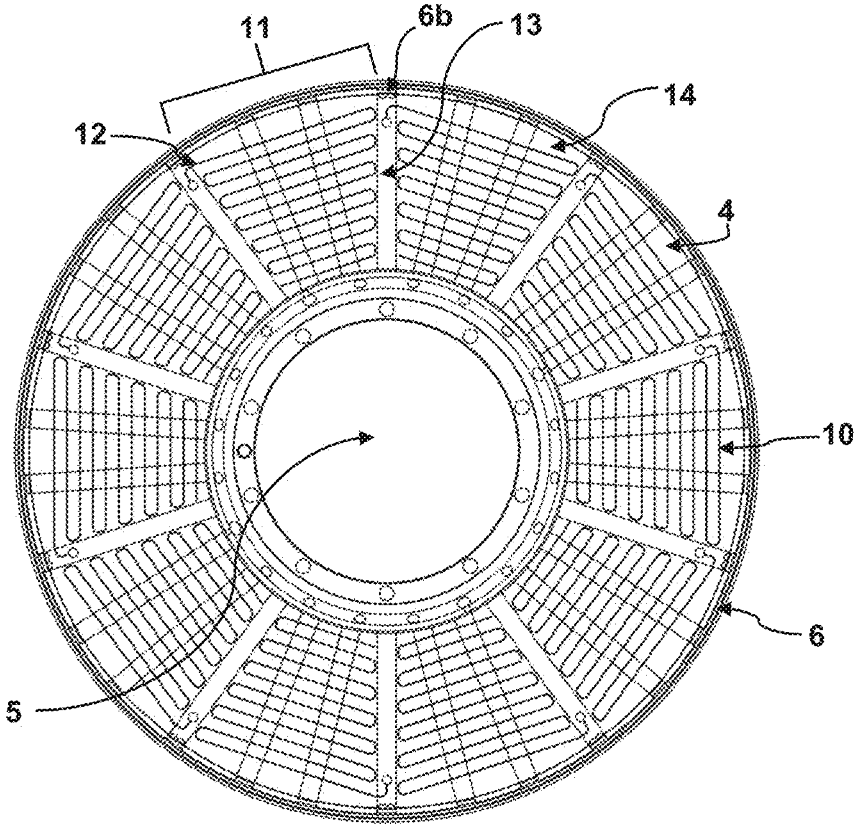
FIG. 6—is a top view of a base and of a grooved plate of a rotor yoke according to an embodiment of the present invention.
Figure 7:
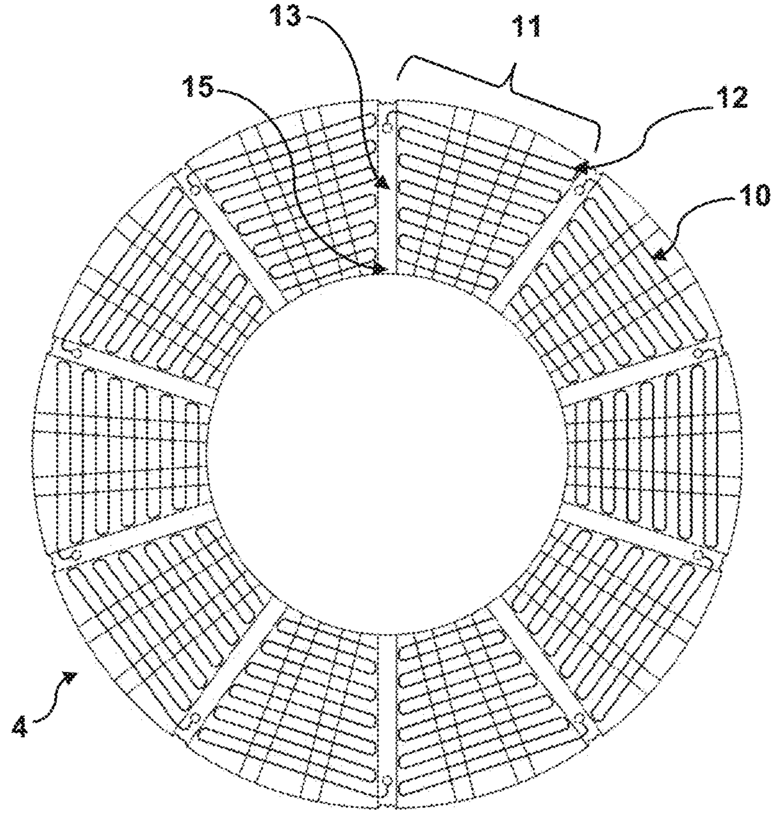
FIG. 7—is a top view of a grooved plate of a rotor yoke according to an embodiment of the present invention.

FIG. 6 shows a grooved plate 4 received on the lowered flat ring wall of the yoke base and FIG. 7 shows said plate illustrated in isolation.

The grooved plate 4 is ring-shaped with a surface wherein a plurality of through-grooves 10 is formed.

The through-grooves 10 are preferably formed by laser cutting and are distributed radially along the plate 4.

In the embodiment shown in the figures, the plurality of through-grooves 10 is formed by radially-distributed grooved sections 11. Each one of the grooved sections 11 preferably comprises a continuous zig-zag-shaped through-groove 12, such that the groove 12 has portions substantially parallel which decrease in length as they approach the central hole 5.

In embodiments of the invention wherein the grooved plate is formed by a plurality of plate segments fastened to the base, as grooved sections are correspondingly formed in the plate segments.

In an alternative embodiment of the present invention, the continuous zig-zag-shaped through-groove could be formed by a plurality of portions substantially parallel which extend radially.

Additionally, the grooves 12 could be alternatively formed by substantially parallel portions in other shapes, such as rectilinear portions or arc segments.

Since in the preferred embodiment the groove 12 is formed by laser cutting, the start of the continuous groove may comprise a small hole arising from the cutting process.

Manufacturing with laser cutting manages to produce grooves 12 with thinner beam/grooves the thinner the plates. The lesser thickness of the grooves means the magnetic permeability of the yoke is not adversely affected.

Between two adjacent grooved sections 11 a non-grooved plate section 13 is formed, such that a grooved plate 4 has a plurality of non-grooved plate sections 13. Accordingly, each one of said non-grooved sections 13 extends in a radius portion between an inner edge and an outer edge of the ring plate.

As illustrated in FIG. 6, in the embodiment illustrated, each one of said non-grooved sections 13 is radially aligned with a portion of the plurality of wall portions of a second height 6*b* of the outer edge cut-out wall 6 of the base plate 3. However, in other embodiments, said alignment may not be present.

The non-grooved sections 13 help maintain the rigidity of the combination and enable one-piece construction and structural sturdiness.

In the embodiments of the invention wherein the grooved plate is formed by a plurality of plate segments fastened to the base, the non-grooved sections may be correspondingly formed on the edges of the plate segments or alternatively the non-grooved sections may be formed by voids between segments.

Figure 8:
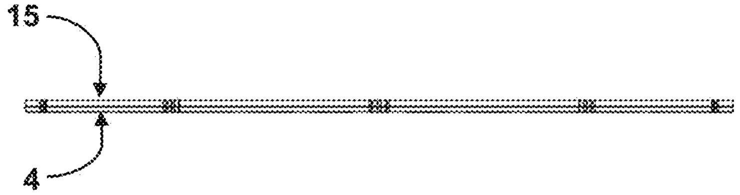
FIG. 8—is a front view of two grooved plates of a rotor yoke according to an embodiment of the present invention.

In an embodiment of the present invention, the rotor yoke comprises two identical, overlapping grooved plates fastened to the yoke base 3. Said fastening may occur, for example, by welding, glue or screws. Therefore, FIG. 8 illustrates two identical, overlapping grooved plates 4, 15 which can be welded to the yoke base 3. However, in alternative embodiments, the base could be formed by a single plate or even by a plurality of plates.

Figure 9:
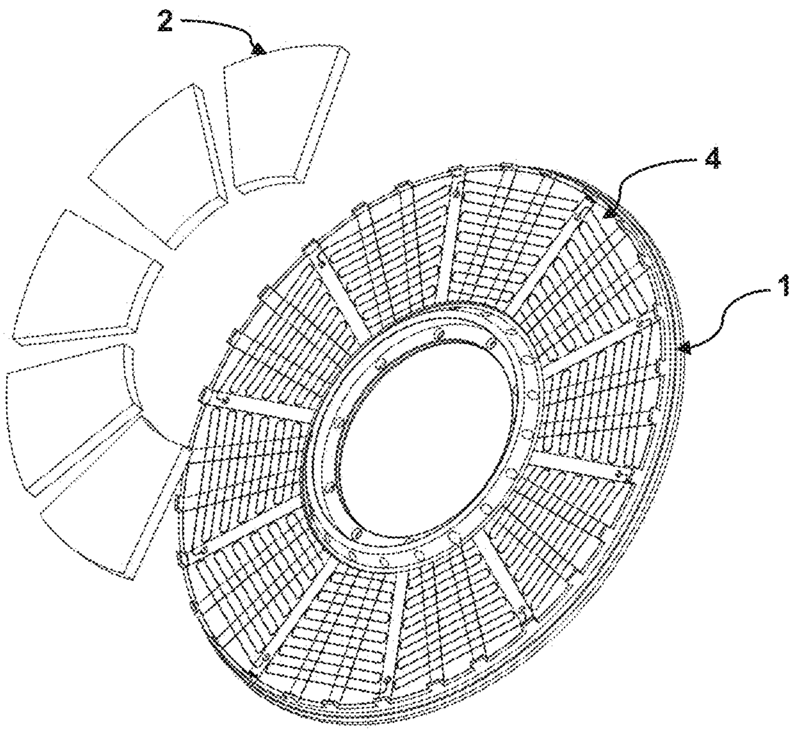
FIG. 9—is a schematic view illustrating five magnets that will be fastened on a rotor yoke according to an embodiment of the present invention, the yoke also being shown in the drawing.
Figure 10:
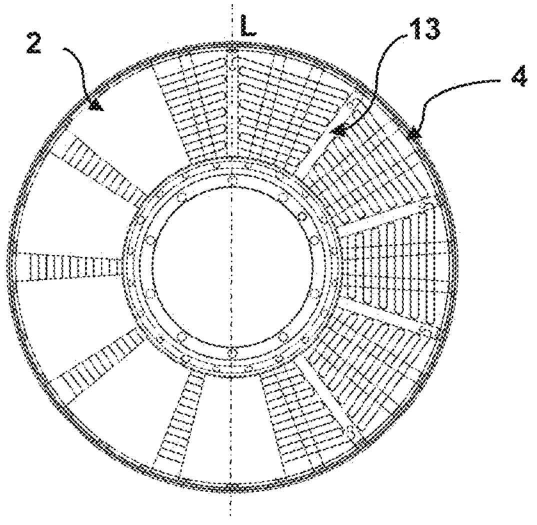
FIG. 10—is a top view, illustrating five magnets fastened on a rotor yoke according to an embodiment of the present invention, the yoke also being shown in the figure.

FIGS. 9 and 10 schematically illustrate the fastening of the magnets 2 on the grooved plate 4 of the rotor yoke 1. The figures show the fastening of five magnets, so as to enable the visualization of part of the plate 4, though it should be understood that more magnets could be fastened. It is notable that the magnet referred to in the present invention may be constituted by a plurality of magnet segments or by a one-piece magnet.

As better illustrated in FIG. 9, in a preferred embodiment of the present invention, the center of each one of the magnets of the rotor is aligned with one of the non-grooved sections 13.

This alignment, which may be defined in terms of an L-central radial line of the magnet coinciding with a central line of the non-grooved section 13 (see FIG. 10), is advantageous because the yoke region in the center of the magnets is the region with lower magnetic induction.

In the embodiment of the invention illustrated in the drawings, the grooved sections 11 comprise recesses 14 which can be used for allocating glue for fastening the magnets. It should be emphasized, however, that in alternative embodiments of the present invention, the recesses may not be present and the glue could be placed directly on the plate 4.

Therefore, the rotor yoke of the present invention presents a construction that reduces the occurrence of eddy current losses while maintaining the rigidity of the yoke and enables the correct and safe fastening of the magnets on the rotor of the machine. Additionally, the alignment between the center of the magnet and the non-grooved section of the grooved plate and the existence of intermittences in the yoke and support ring significantly contributes to reduce eddy current losses.

Having described preferred sample embodiments of the present invention, it should be understood that the scope of the present invention covers other possible variations of the inventive concept described, being limited solely by the content of the accompanying claims, potential equivalents included therein.

The invention claimed is:

1. A rotor yoke (1) for a rotor of a rotating electric machine, the rotor yoke (1) comprising:
- a yoke base (3);
- at least one grooved plate (4) fastened to the yoke base (3); and
- wherein the yoke base (3) is arranged to receive the at least one grooved plate (4);
- the at least one grooved plate (4) comprising a plurality of through-grooves (10) formed by radially-distributed grooved sections (11);
- wherein, between two adjacent grooved sections (11), a non-grooved plate section (13) is formed, such that the grooved plate (4) comprises a plurality of non-grooved plate sections (13);
- the rotor yoke (1) comprising a plurality of magnets fastened on the grooved plate (4), wherein a central region of each magnet is aligned with a corresponding non-grooved section (13), so that a radial geometric line (L) of each magnet is coincident with a central radial geometric line matching each corresponding non-grooved section (13).

2. The rotor yoke (1) according to claim 1, wherein each one of the plurality of grooved sections (11) presents recesses (14) for allocating glue for magnets.

3. The rotor yoke (1) according to claim 1, wherein the yoke base (3) comprises a ring disk with a central hole (5), an outer edge wall (6) an inner edge wall (7), and a lowered flat base formed between the outer edge wall (6) and the inner edge wall (7).

4. The rotor yoke (1) according to claim 3, wherein the outer edge wall (6) comprises a cut-out wall formed by a plurality of wall portions of a first height (**6*a*) and a plurality of wall portions of a second height (6*b***), wherein the second height is higher than the first height.

5. The rotor yoke (1) according to claim 4, wherein each one of the plurality of non-grooved plate sections (13) is radially aligned with a portion of the plurality of wall portions of a second height (**6*b***).

6. The rotor yoke (1) according to claim 1, wherein each one of the grooved sections (11) comprises a continuous zig-zag-shaped through-groove (12), the continuous zig-zag-shaped through-groove (12) having portions substantially parallel that decrease in length as they approach the central hole (5).

7. The rotor yoke (1) according to claim 6, wherein the continuous zig-zag-shaped through-groove (12) is formed by laser cutting.

8. The rotor yoke (1) according claim 1, wherein each one of the grooved sections (11) comprises a continuous zig-zag-shaped through-groove, the continuous zig-zag-shaped through-groove having a plurality of portions substantially parallel which extend radially.

9. The rotor yoke (1) according to claim 1, wherein the at least one grooved plate (4) comprises two grooved plates (4, 15).

* * * * *